United States Patent [19]
Li et al.

[11] Patent Number: 5,649,609
[45] Date of Patent: Jul. 22, 1997

[54] BRAKE ARM WITH ADJUSTABLE APPLIED FORCE RATIO FOR A BICYCLE BRAKE DEVICE

[75] Inventors: Jung-Hua Li, Chang-Hua; Chi-Cheng Lai, Taichung Hsien, both of Taiwan

[73] Assignee: Ah-Ping Lin, Taiwan

[21] Appl. No.: 642,603

[22] Filed: May 3, 1996

[51] Int. Cl.⁶ .......................................................... B62L 1/06
[52] U.S. Cl. .......................... 188/24.19; 188/2 D; 74/522
[58] Field of Search ........................ 188/24.15, 24.18, 188/24.19, 24.21, 24.22, 2 D, 72.9, 196 M; 74/522, 525; 403/3, 4

[56] References Cited

U.S. PATENT DOCUMENTS

| 2,425,979 | 8/1947  | Bachman  | 74/522       |
| 3,628,635 | 12/1971 | Yoshigai | 188/24.19 X  |
| 4,027,746 | 6/1977  | Kine     | 188/24.21 X  |
| 5,431,256 | 7/1995  | Wen      | 188/24.19    |

FOREIGN PATENT DOCUMENTS

| 443778 | 10/1912 | France | 188/24.21 |
| 456893 | 9/1913  | France | 188/24.21 |

Primary Examiner—Lee W. Young
Attorney, Agent, or Firm—Banner & Witcoff, Ltd.

[57] ABSTRACT

A brake arm for a brake device of a bicycle includes first and second arm members and a locking unit. The first arm member has an elongated arm body with an upper end portion, a lower end portion and a shoe mounting portion between the upper and lower end portions. The upper end portion is formed with a threaded hole. The lower end portion is adapted to be secured pivotally on the bicycle. The mounting portion has a brake shoe attached thereto. The second arm member is formed as an elongated member with first and second end portions and an intermediate portion between the first and second end portions. The second arm member is provided with a mounting hole unit which extends from the first end portion toward the second end portion. The second end portion of the second arm member is provided with a wire attaching unit that is adapted to be connected operably to the brake device. The locking unit extends through the mounting hole unit in the second arm member and engages threadedly the threaded hole in the upper end portion of the arm body of the first arm member, thereby mounting adjustably the second arm member on the first arm member to permit varying of distance between the wire attaching unit and the lower end portion of the first arm member.

5 Claims, 6 Drawing Sheets

BRAKE ARM WITH ADJUSTABLE APPLIED FORCE RATIO FOR A BICYCLE BRAKE DEVICE

BACKGROUND OF THE INVENTION

1. Field of the Invention

The invention relates to a bicycle brake device, more particularly to a brake arm with an adjustable applied force ratio for a bicycle brake device.

2. Description of the Related Art

Referring to FIG. 1, a conventional brake arm 10 for a bicycle brake device is shown to have an arm body 11 with a wire attaching unit 110 provided on an upper end portion, a pivot hole 116 formed in a lower end portion, and a shoe mounting portion 114 between the upper and lower end portions. A brake shoe 13 is attached to the mounting portion 114. The wire attaching unit 110 is adapted to be secured to a pull wire of the bicycle brake device (not shown), whilst a fastener extends through the pivot hole 116 to secure the arm body 11 to a bicycle (not shown). When a brake lever of the bicycle brake device is pulled, the pull wire applies a pulling force on the brake arm 10, thereby causing the latter to pivot and enable the brake shoe 13 to contact a wheel of the bicycle.

The ratio of the force that is applied by the brake shoe 13 to the bicycle wheel to the force that is applied by the pull wire to the brake arm 10 is equal to the ratio of the distance (a) between the wire attaching unit 110 and the pivot hole 116 to the distance (b) between the shoe mounting portion 114 and the pivot hole 116. Thus, assuming that the force that is applied to the brake arm 10 remains constant, a stronger braking effect is obtained when the distance ratio (a/b) is larger, while a weaker braking effect is obtained when the distance ratio (a/b) is smaller.

Since the distance ratio (a/b) of the conventional brake arm 10 cannot be adjusted, the applied force ratio of the conventional brake arm 10 is similarly non-adjustable. Therefore, the conventional brake arm 10 is unsuited for use in mountain bicycles, which require a brake arm with an applied force ratio that can be varied in accordance with the road conditions.

SUMMARY OF THE INVENTION

Therefore, the object of the present invention is to provide a brake arm with an adjustable applied force ratio for a bicycle brake device.

Accordingly, the brake arm of the present invention includes first and second arm members and a locking unit. The first arm member has an elongated arm body with an upper end portion, a lower end portion and a shoe mounting portion between the upper and lower end portions. The upper end portion is formed with a threaded hole. The lower end portion is adapted to be secured pivotally on a bicycle. The mounting portion has a brake shoe attached thereto. The second arm member is formed as an elongated member with first and second end portions and an intermediate portion between the first and second end portions. The second arm member is provided with a mounting hole unit which extends from the first end portion toward the second end portion. The second end portion is provided with a wire attaching unit that is adapted to be connected operably to a bicycle brake device. The locking unit extends through the mounting hole unit in the second arm member and engages threadedly the threaded hole in the upper end portion of the arm body of the first arm member, thereby mounting adjustably the second arm member on the first arm member to permit varying of the distance between the wire attaching unit and the lower end portion of the first arm member.

BRIEF DESCRIPTION OF THE DRAWINGS

Other features and advantages of the present invention will become apparent in the following detailed description of the preferred embodiment with reference to the accompanying drawings, of which.

DESCRIPTION OF THE PREFERRED EMBODIMENT

Figure 1:
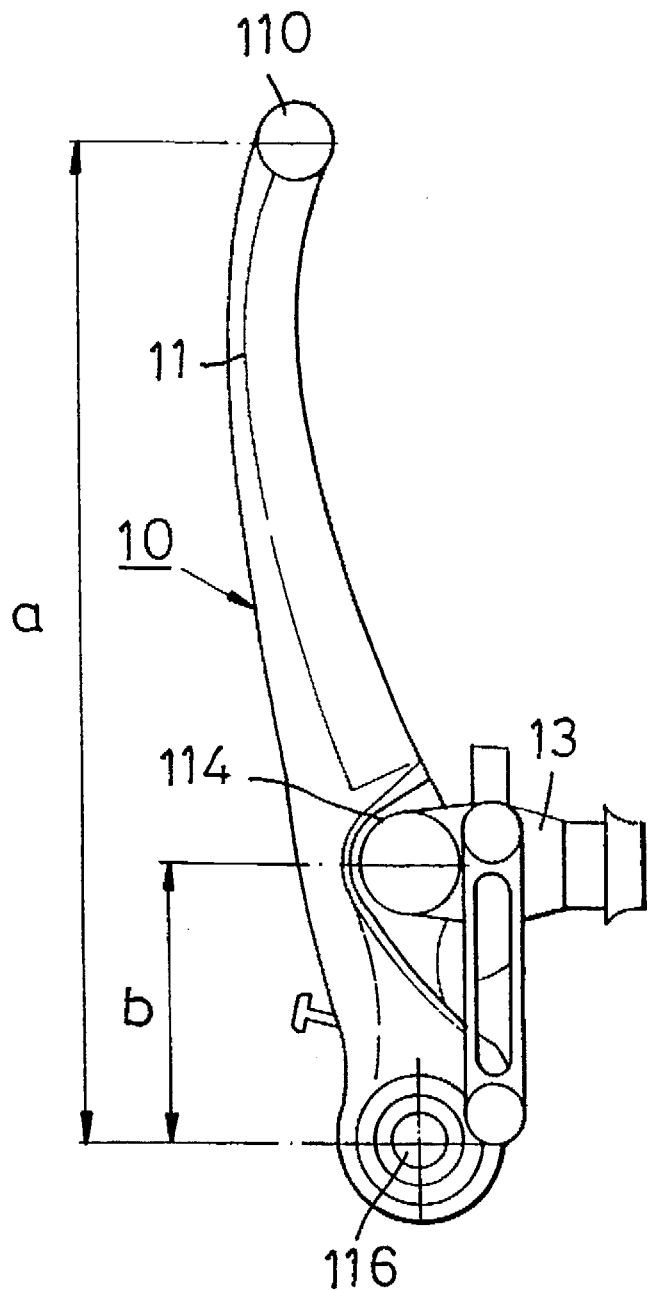
FIG. 1 is a schematic view of a conventional brake arm for a bicycle brake device.
Figure 2:
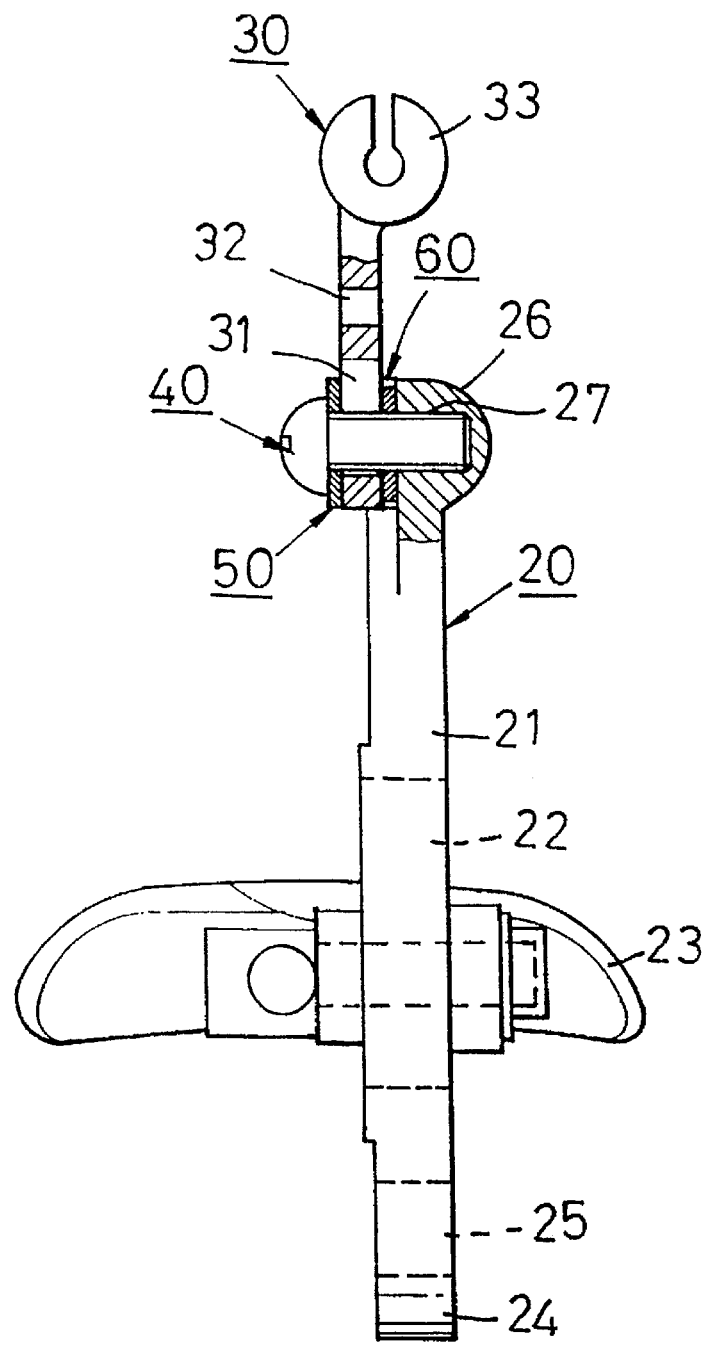
FIG. 2 is a partly sectional, schematic rear view of the preferred embodiment of a brake arm according to the present invention.
Figure 3:
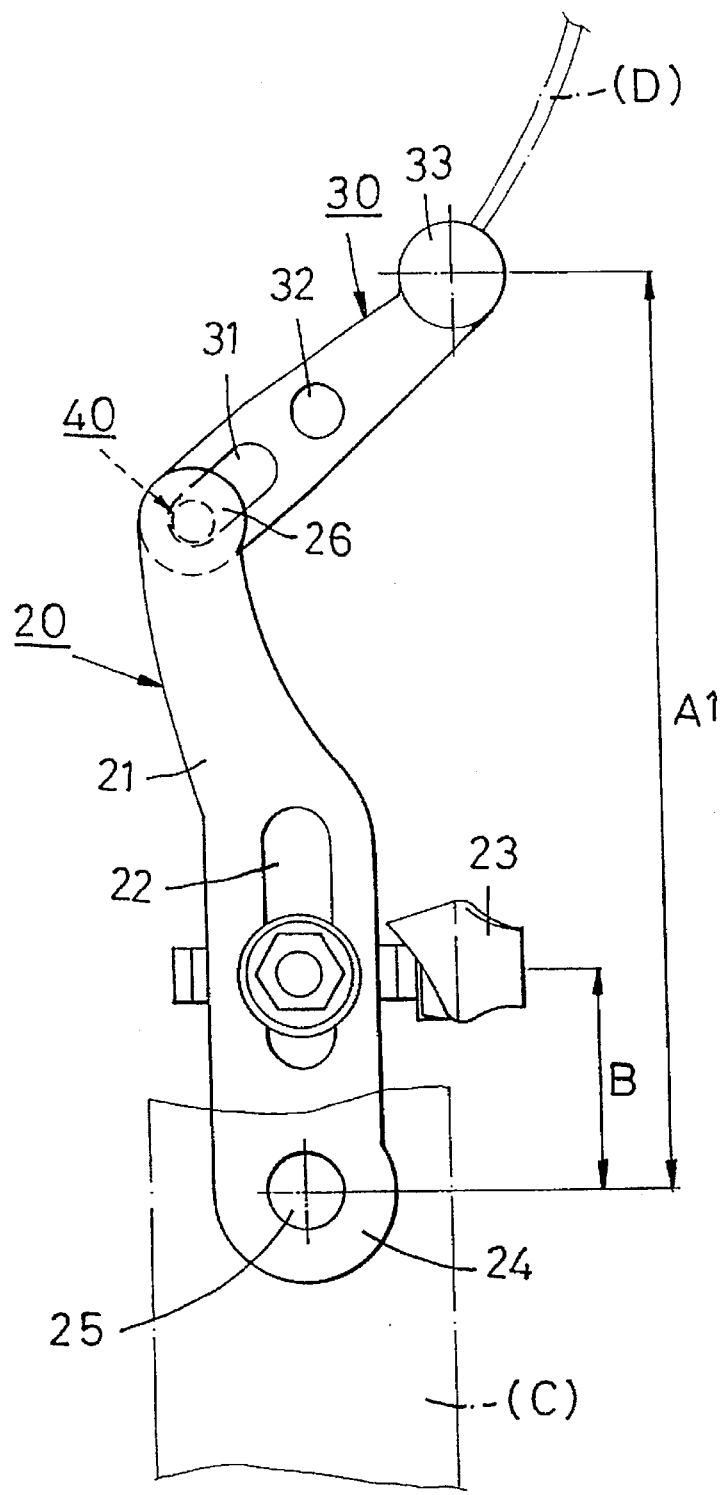
FIGS. 3 to 6 are schematic views which illustrate operation of the preferred embodiment.

Referring to FIGS. 2 and 3, the preferred embodiment of a brake arm according to the present invention is shown to comprise a first arm member 20, a second arm member 30, a locking unit 40, a plain washer 50 and a teethed washer 60.

The first arm member 20 has an elongated arm body 21 with an upper end portion 26, a lower end portion 24 and a shoe mounting portion between the upper and lower end portions 26, 24 and formed with a longitudinal slot 22. A brake shoe 23 is attached to the mounting portion at the longitudinal slot 22. The lower end portion 24 is formed with a pivot hole 25 for mounting pivotally the first arm member 20 to a bicycle (C). The upper end portion 26 is formed with a threaded hole 27.

The second arm member 30 is formed as an elongated member with first and second end portions and an intermediate portion between the first and second end portions. The second arm member 30 is provided with a mounting hole unit 31 which extends from the first end portion to the intermediate portion. In this embodiment, the mounting hole unit 31 is formed as a longitudinal slot. The intermediate portion of the second arm member 30 is provided with a through-hole 32 adjacent to one end of the mounting hole unit 31. The second end portion of the second arm member 30 is provided with a wire attaching unit 33 to be connected operably to one end of a pull wire (D) of the bicycle brake device.

In this embodiment, the locking unit 40 is a screw and is used to mount the second arm member 30 onto the first arm member 20.

During assembly, the plain washer 50 is sleeved on the locking unit 40, and the locking unit 40 is then extended through the mounting hole unit 31 in the second arm member 30. The teethed washer 60 is then sleeved on the locking unit 40. Thus, the plain washer 50 and the teethed washer 60 are disposed on opposite sides of the second arm member 30. The locking unit 40 engages threadedly the threaded hole 27 in the upper end portion 26 of the arm body 21, thereby mounting adjustably the second arm member 30 on the first arm member 20.

Figure 4:
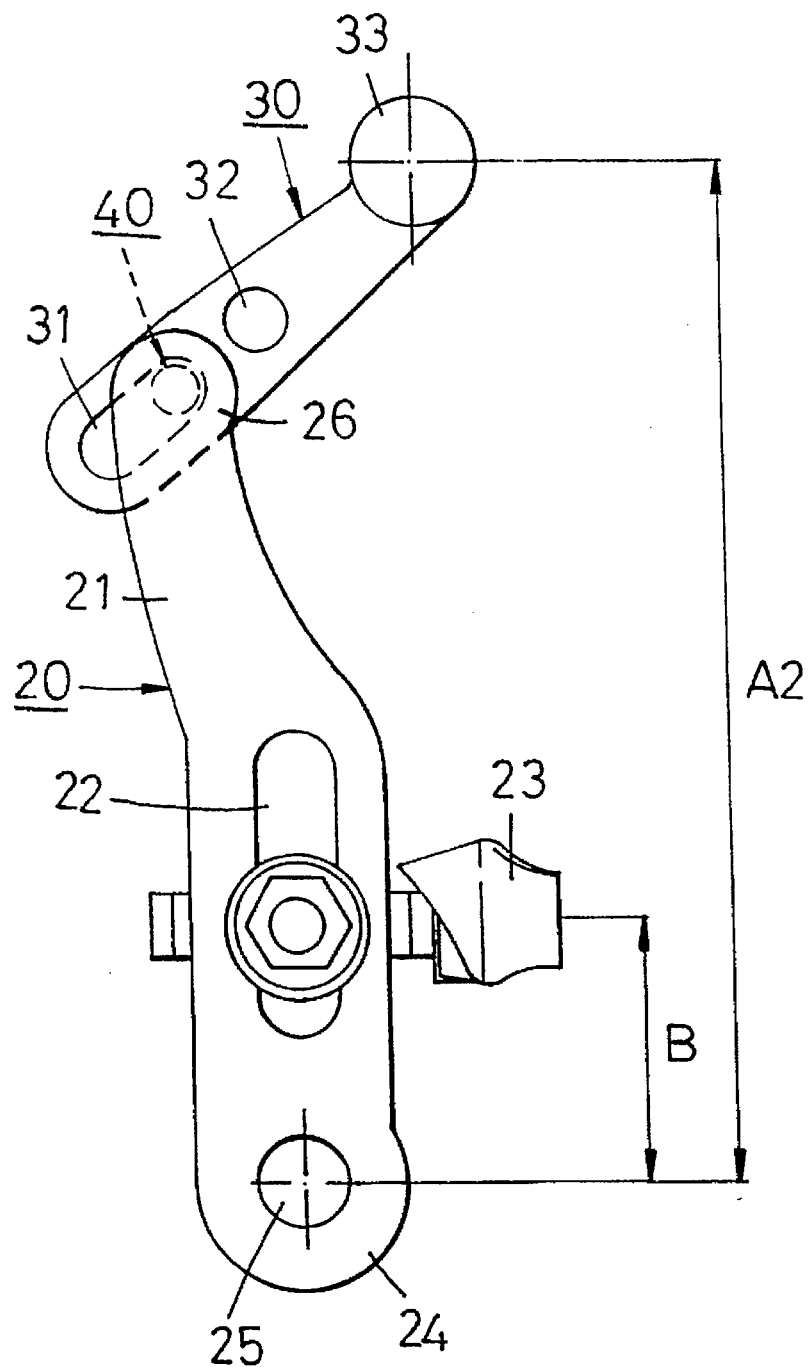

FIG. 3 illustrates the preferred embodiment when the locking unit 40 is disposed in one end of the mounting hole unit 31 distant from the through-hole 32. The wire attaching unit 33 on the second arm member 30 forms a distance (A1) with the pivot hole 25. FIG. 4 illustrates the preferred embodiment when the locking unit 40 is disposed in one end of the mounting hole unit 31 adjacent to the through-hole 32.

Figure 5:
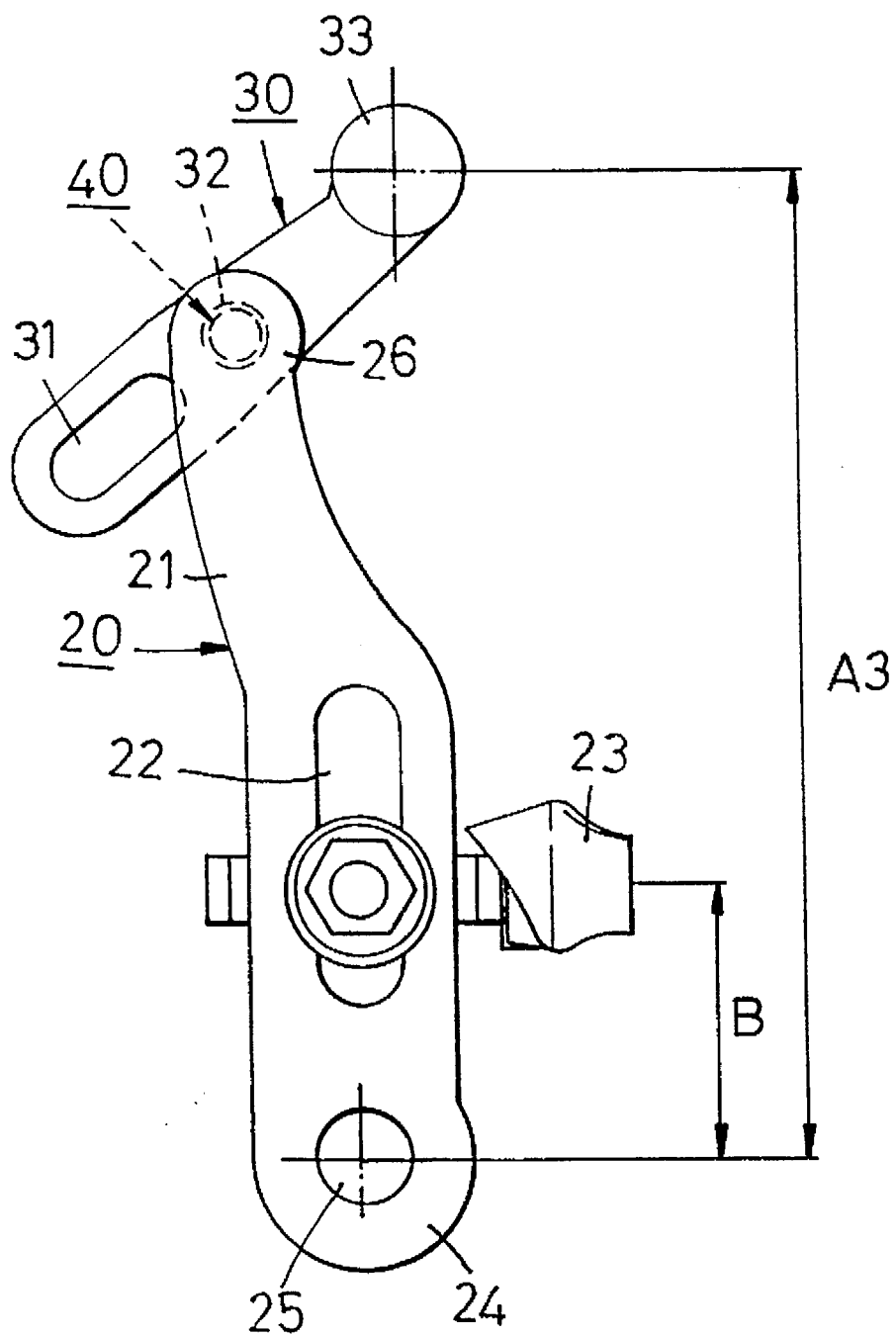

The wire attaching unit 33 forms a distance (A2) with the pivot hole 25. FIG. 5 illustrates the preferred embodiment when the locking unit 40 is disposed in the through-hole 32. The wire attaching unit 33 forms a distance (A3) with the pivot hole 25. The distance (A1) is longer than the distance (A2), while the distance (A2) is longer than the distance (A3). Thus, assuming that the distance (B) between the brake shoe 23 and the pivot hole 25 remains constant, the ratio (A1/B) is greater than the ratio (A2/B), while the ratio (A2/B) is greater than the ratio (A3/B). Since the ratio of the force that is applied by the brake shoe 23 to the bicycle wheel (not shown) to the force that is applied by the pull wire (D) to the brake arm is equal to the ratio of the distance between the wire attaching unit 33 and the pivot hole 25 to the distance (B) between the brake shoe 23 and the pivot hole 25, assuming that the force that is applied to the brake arm remains constant, a stronger braking effect is obtained when the locking unit 40 is in the position shown in FIG. 3, while a weaker braking effect is obtained when the locking unit 40 is in the position shown in FIG. 5.

Figure 6:
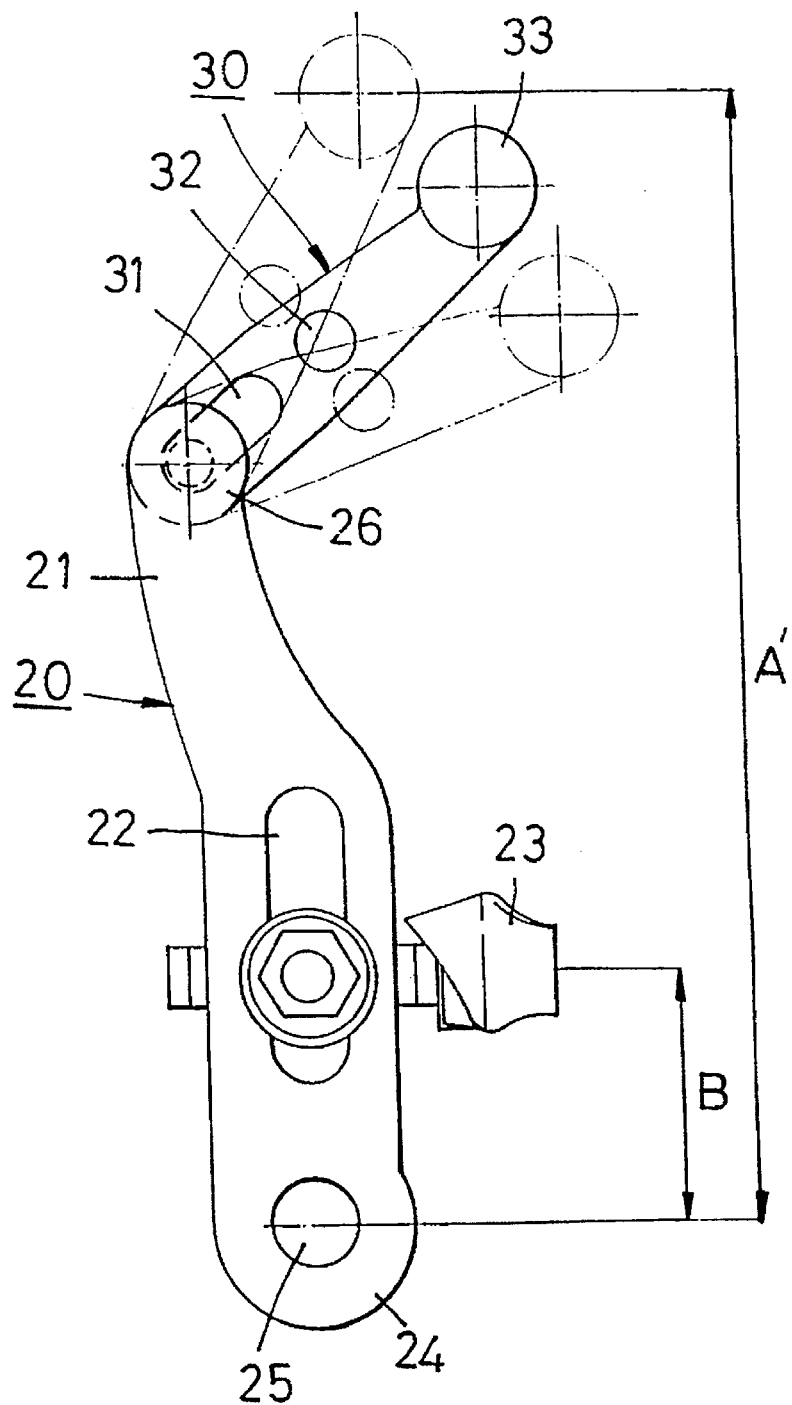

FIG. 6 illustrates another way of adjusting the applied force ratio of the preferred embodiment. As illustrated, the inclination of the second arm member 30 with respect to a horizontal plane can be adjusted so as to vary the distance (A') between the wire attaching unit 33 and the pivot hole 25. As mentioned beforehand, assuming that the force that is applied to the brake arm is constant and that the distance (B) between the brake shoe 23 and the pivot hole 25 is fixed, a stronger braking effect is obtained when the distance (A') is longer, while a weaker braking effect is obtained when the distance (A') is shorter.

It has thus been shown that the distance between the wire attaching unit 33 and the pivot hole 25 can be varied so as to result in an adjustable applied force ratio. The object of the present invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A brake arm for a brake device of a bicycle, comprising:

a first arm member having an elongated arm body with an upper end portion, a lower end portion and a shoe mounting portion between said upper and lower end portions, said upper end portion being formed with a threaded hole, said lower end portion being adapted to be secured pivotally on the bicycle, said mounting portion having a brake shoe attached thereto;

a second arm member formed as an elongated member with first and second end portions and an intermediate portion between the first and second end portions, said second arm member being provided with a mounting hole unit which extends from said first end portion toward said second end portion, said second end portion of said second arm member being provided with a wire attaching unit that is adapted to be connected operably to the brake device; and a locking unit which extends through said mounting hole unit in said second arm member and which engages threadedly said threaded hole in said upper end portion of said arm body of said first arm member, said locking unit mounting adjustably said second arm member on said first arm member to permit varying of distance between said wire attaching unit and said lower end portion of said first arm member.

2. The brake arm as claimed in claim 1, wherein said mounting hole unit is formed as a longitudinal slot.

3. The brake arm as claimed in claim 1, wherein said intermediate portion of said second arm member is provided with a through-hole adjacent to one end of said mounting hole unit.

4. The brake arm as claimed in claim 1, further comprising a plain washer and a teethed washer sleeved on said locking unit on opposite sides of said second arm member.

5. The brake arm as claimed in claim 1, wherein said mounting portion is formed with a longitudinal slot, said brake shoe being attached to said mounting portion at said longitudinal slot.

* * * * *